(12) United States Patent
Shin et al.

(10) Patent No.: US 7,203,055 B2
(45) Date of Patent: Apr. 10, 2007

(54) METHOD OF MANUFACTURING MULTILAYERED CERAMIC CAPACITOR BY SPIN COATING AND MULTILAYERED CERAMIC CAPACITOR

(75) Inventors: Hyo Soon Shin, Kyungki-do (KR); Seung Hyun Ra, Kyungki-do (KR); Yong Suk Kim, Kyungki-do (KR); Hyoung Ho Kim, Kyungki-do (KR); Ho Sung Choo, Daegu (KR); Jung Woo Lee, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 90 days.

(21) Appl. No.: 11/011,092

(22) Filed: Dec. 15, 2004

(65) Prior Publication Data
US 2005/0128680 A1   Jun. 16, 2005

(30) Foreign Application Priority Data
Dec. 15, 2003   (KR) .................... 10-2003-0091591

(51) Int. Cl.
*H01G 4/228*   (2006.01)
(52) U.S. Cl. .................. 361/306.3; 361/306.1; 361/311; 361/313; 361/321.1; 361/321.2; 361/321.3; 501/134; 501/135; 501/138; 501/139; 29/25.41; 29/25.42
(58) Field of Classification Search ............ 361/306.3, 361/306.1, 311–313, 321.1, 321.2, 321.3, 361/321.5; 29/25.41, 25.42, 25.03; 501/134–135; 501/138–139; 428/213, 325
See application file for complete search history.

(56) References Cited

U.S. PATENT DOCUMENTS

| | | | |
|---|---|---|---|
| 5,793,600 A * | 8/1998 | Fukuda et al. ............ 361/321.4 |
| 6,071,555 A * | 6/2000 | Sengupta et al. ......... 427/126.3 |
| 6,232,167 B1* | 5/2001 | Satoh et al. ................. 438/240 |
| 6,254,715 B1* | 7/2001 | Okazaki et al. ............. 156/280 |
| 6,514,603 B2* | 2/2003 | Chazono ..................... 428/213 |
| 6,631,070 B2* | 10/2003 | Schmidt et al. .......... 361/321.2 |
| 2002/0106577 A1* | 8/2002 | Kubota ....................... 430/252 |

FOREIGN PATENT DOCUMENTS

KR   2003-74303   9/2003

OTHER PUBLICATIONS

Korean Intellectual Property Office, Office Action, mailed Apr. 26, 2006.

* cited by examiner

*Primary Examiner*—Nguyen T. Ha
(74) *Attorney, Agent, or Firm*—Lowe Hauptman & Berner, LLP

(57) ABSTRACT

Disclosed herein is a method of manufacturing a multilayered ceramic capacitor by a spin coating process, and a multilayered ceramic capacitor obtained by the above method. The method of the current invention provides a plurality of dielectric layers formed by spin coating, in which the process of coating the dielectric layer and the process of printing the inner electrode can be provided as a single process. Therefore, the thickness of the dielectric layer is easily controlled while the dielectric layer is formed to be thin. Further, since the dielectric layers and the inner electrodes are formed successively, the processes of separating and layering the dielectric layers, and the process of compressing the ceramic multilayered body can be omitted. Thereby, the ceramic multilayered body need not be compressed, and thus, a pillowing phenomenon does not occur in the multilayered ceramic capacitor.

49 Claims, 9 Drawing Sheets

METHOD OF MANUFACTURING MULTILAYERED CERAMIC CAPACITOR BY SPIN COATING AND MULTILAYERED CERAMIC CAPACITOR

RELATED APPLICATIONS

The present application is based on, and claims priority from, Korea Application Number 10-2003-0091591, filed Dec. 15, 2003, the disclosure of which is hereby incorporated by reference herein in its entirety.

BACKGROUND OF THE INVENTION

1. Field of the Invention

The present invention relates generally to a method of manufacturing a multilayered ceramic capacitor by a spin coating process, and a multilayered ceramic capacitor obtained by the above method, and more specifically, to a method of manufacturing a multilayered ceramic capacitor, in which the formation of dielectric layers by spin coating and the formation of inner electrodes thereon are repeatedly performed.

2. Description of the Related Art

A multilayered ceramic capacitor comprises a multilayered ceramic sintered body including a plurality of dielectric layers and inner electrodes formed between the dielectric layers, as illustrated in FIG. 1. In addition, outer electrodes are formed on the sintered body to be electrically connected to the inner electrodes of the sintered body, and also, plated layers are formed on the outer electrodes.

Typically, the dielectric layer in the multilayered ceramic capacitor is prepared by a tape casting process. In the tape casting process, as shown in FIG. 2, a liquid phase ceramic slurry having ceramic powder uniformly dispersed therein is coated on a carrier film through a die, and then dried, to obtain a green sheet. The ceramic slurry for the tape casting process is obtained by mixing the ceramic powder such as $BaTiO_3$, with a solvent, a dispersing agent, and a binder. Various additives may be used to alter the characteristics of the dielectric layer, if necessary.

Thereafter, an inner electrode pattern is printed on the green sheet. For this, a screen printing process is mainly used. The green sheets each of which has the electrode printed thereon are layered to a predetermined number, compressed, cut and then sintered, to manufacture a multilayered ceramic sintered body.

Recently, to develop the ultrahigh capacity multilayered ceramic capacitor, thorough research into thinning the dielectric layer is being conducted. However, limitations are imposed on the formation of thin dielectric layers by the tape casting process. Even if the green sheet is formed to be thin, it is difficult to separate the green sheet from the carrier film. In addition, for the multilayered ceramic capacitor, unevenness due to a step between a surface with inner electrode printed thereon and a surface with no inner electrode printed thereon may cause a pillowing phenomenon.

Thus, a novel method of fabricating the multilayered ceramic capacitor is required, instead of the tape casting process. To satisfy the industrial requirements, extensive and intensive studies have been made, but a desirable solution has not been provided yet.

On the other hand, in techniques for coating a thick ceramic film on a substrate to form a single layer, a spin coating process is used. That is, the sol containing ceramic powder such as PZT ($PbZrTiO_3$) is spin coated at a thickness of 5–20 μm on the substrate, to obtain a PZT film.

In this way, although the spin coating process is used for coating a single layer of thick ceramic film on the substrate, it has not been applied to the fabrication of the multilayered ceramic capacitor to date. This is because it is believed that a process of forming a plurality of dielectric layers on a substrate by spin coating while printing electrodes, to form a bulk body, and then separating the bulk body from the substrate, cannot be achieved.

SUMMARY OF THE INVENTION

Accordingly, the present invention has been made keeping in mind the above problems occurring in the related art, and it is an object of the present invention to provide a method of manufacturing a multilayered ceramic capacitor, in which dielectric layers are formed by a spin coating process and inner electrodes are interposed therebetween so that the dielectric layers and the electrodes are alternately layered to form a ceramic multilayered body, thereby preventing a pillowing phenomenon.

Further it is an object of the present invention to provide a multilayered ceramic capacitor manufactured by the above method.

In order to accomplish the above objects, according to a first embodiment of the present invention, a method of manufacturing a multilayered ceramic capacitor is provided, the method comprising a first step of forming a first dielectric layer on a substrate by spin coating; a second step of forming an inner electrode on the dielectric layer; a third step of forming a second dielectric layer on the inner electrode by spin coating; a fourth step of repeating the second step and the third step, to form a ceramic multilayered body having a predetermined number of layers; a fifth step of separating the ceramic multilayered body from the substrate; a sixth step of sintering the separated ceramic multilayered body; and a seventh step of forming outer electrodes on the ceramic sintered body.

Further, according to a second embodiment of the present invention, a method of manufacturing a multilayered ceramic capacitor is provided, the method comprising a first step of preparing (a) a particulate sol composed of ceramic powder of a dielectric material and an organic solvent, and (b) a polymeric sol composed of a metal precursor solution of a dielectric material and an organic solvent, followed by mixing (a) and (b), to prepare a hybrid sol; a second step of forming a first dielectric layer on a substrate by spin coating using the hybrid sol, followed by drying; a third step of forming an inner electrode on the dielectric layer; a fourth step of forming a second dielectric layer on the inner electrode by spin coating using the hybrid sol, followed by drying; a fifth step of repeating the third step and the fourth step, to form a ceramic multilayered body having a predetermined number of layers; a sixth step of separating the ceramic multilayered body from the substrate; a seventh step of cutting the separated ceramic multilayered body, followed by sintering; and an eighth step of forming outer electrodes on the ceramic sintered body.

Furthermore, according to a third embodiment of the present invention, a method of manufacturing a multilayered ceramic capacitor is provided, the method comprising a first step of preparing (a) a particulate sol composed of ceramic powder of a dielectric material and an organic solvent, and (b) a polymeric sol composed of a metal precursor solution of a dielectric material, an organic solvent and a polymer material, followed by mixing (a) and (b), to prepare a hybrid sol; a second step of forming a first dielectric layer on a substrate by spin coating using the hybrid sol, followed by drying; a third step of forming an inner electrode on the dielectric layer; a fourth step of forming a second dielectric layer on the inner electrode by spin coating using the hybrid sol, followed by drying; a fifth step of repeating the third step and the fourth step to form a ceramic multilayered body having a predetermined number of layers; a sixth step of separating the ceramic multilayered body from the substrate; a seventh step of cutting the separated ceramic multilayered body, followed by sintering; and an eighth step of forming outer electrodes on the ceramic sintered body.

In addition, the present invention provides a multilayered ceramic capacitor, comprising the multilayered ceramic sintered body manufactured by any one method as mentioned above, in which the inner electrodes of the sintered body and the outer electrodes are electrically connected to each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a detailed description will be given of the present invention.

Figure 1:
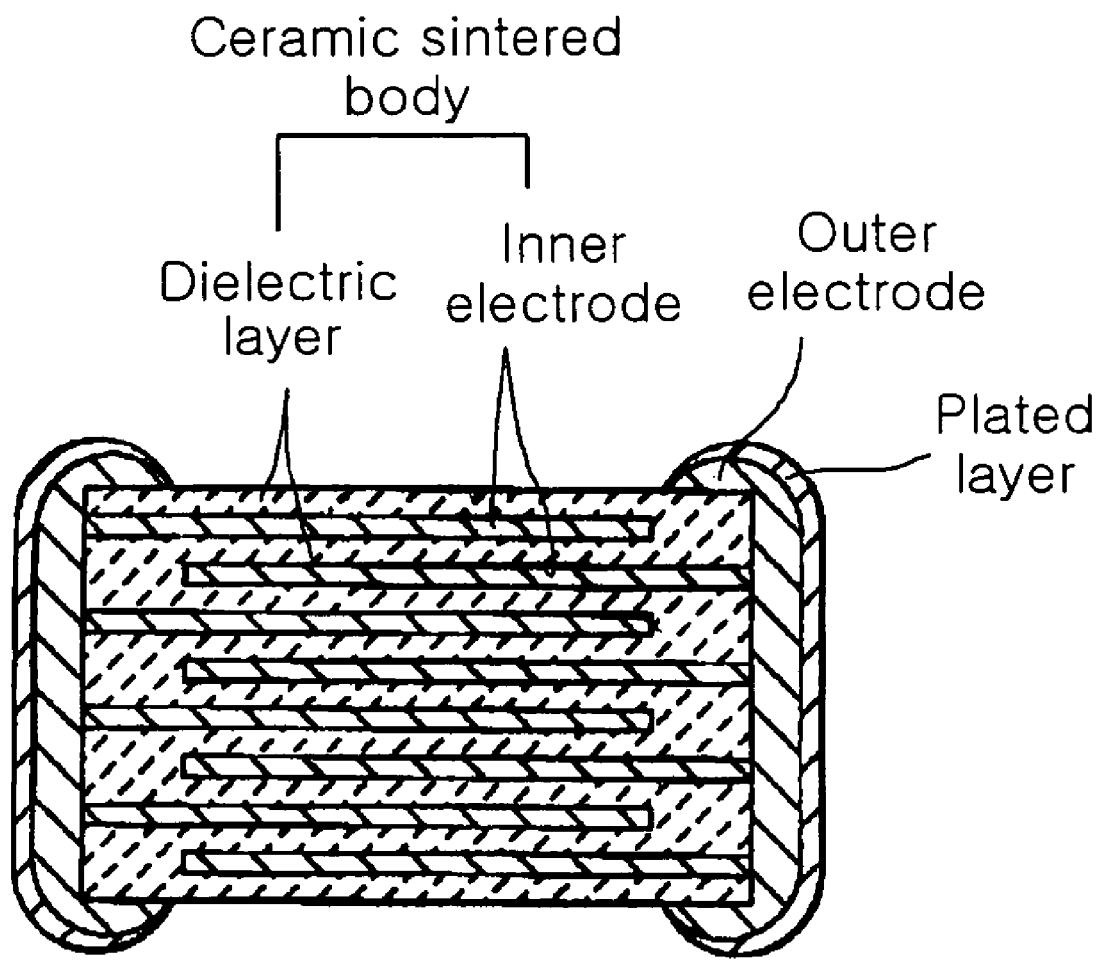
FIG. 1 is a sectional view showing a multilayered ceramic capacitor.
Figure 2:
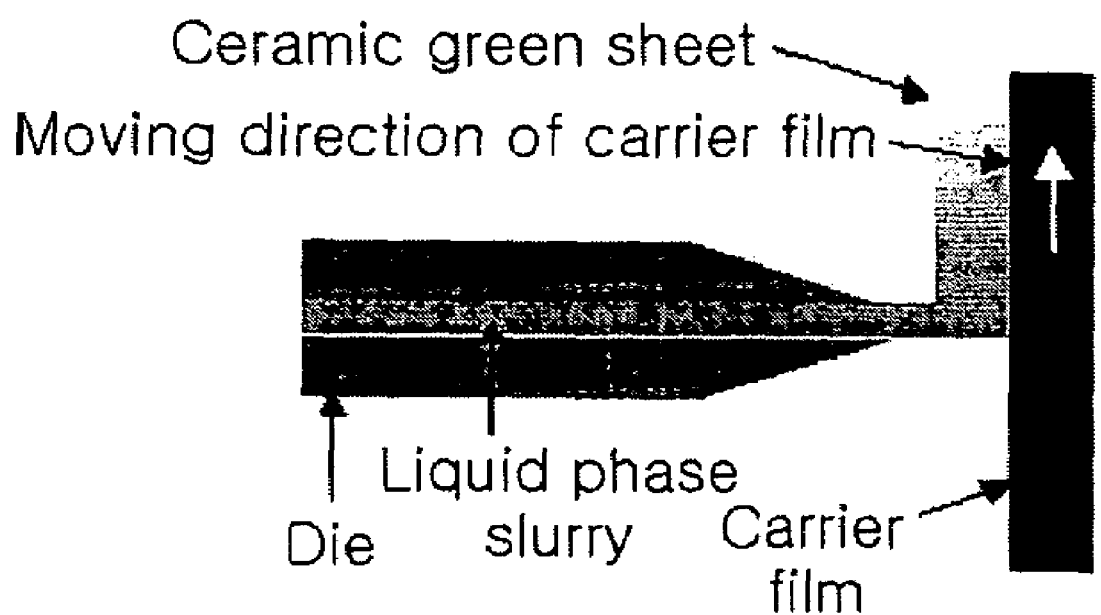
FIG. 2 is a view showing a tape casting process used conventionally.
Figure 3A:
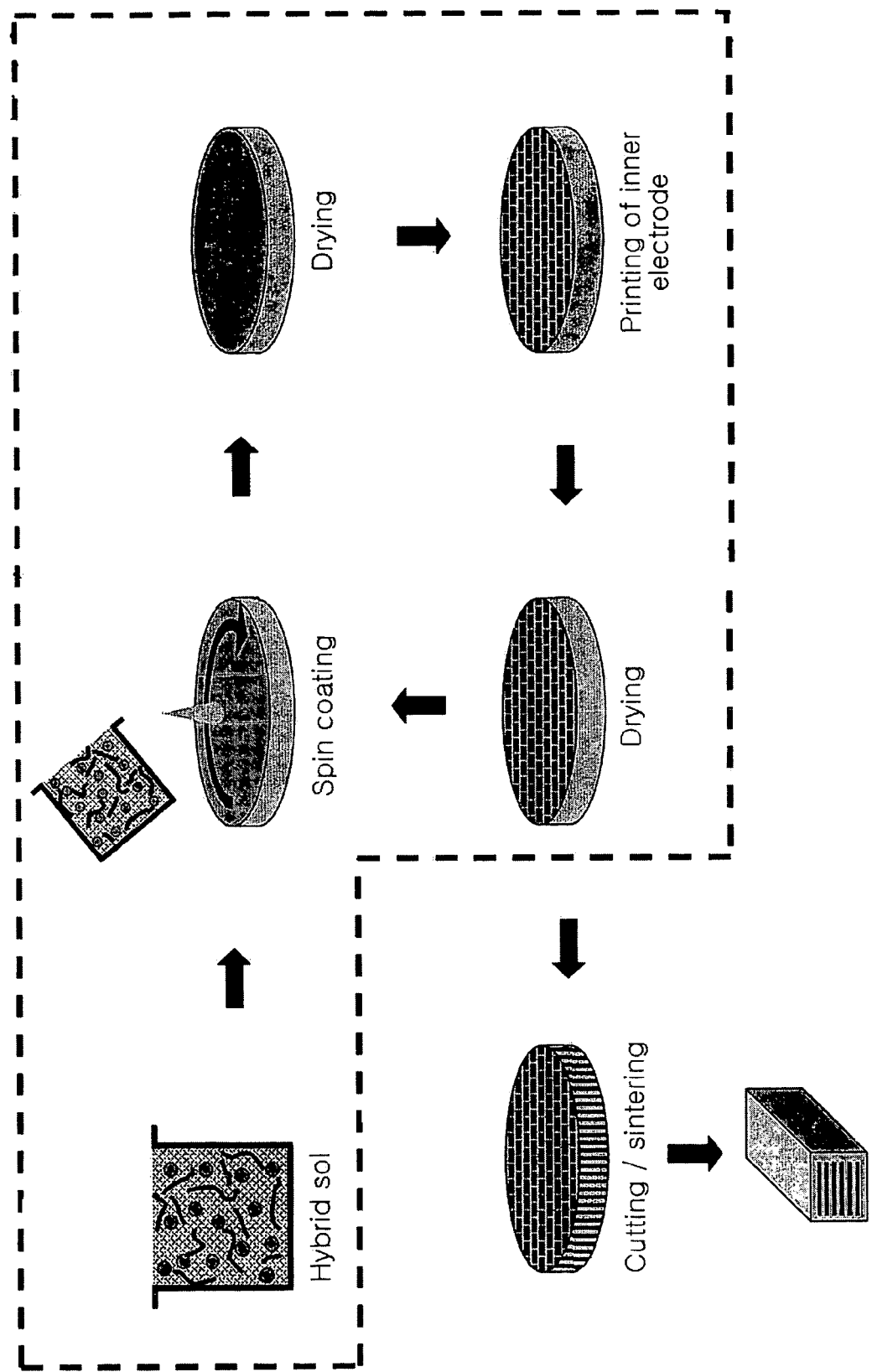
FIG. 3A is a view showing a method of manufacturing a multilayered ceramic capacitor by a spin coating process, according to the present invention.

According to the present invention, it is provided a method of manufacturing a ceramic multilayered body including a plurality of dielectric layers and inner electrodes formed between the dielectric layers, in which the dielectric layer is formed using a spin coating process. The manufacturing process is illustrated in FIG. 3A. By adopting the spin coating process, a compression process of the ceramic multilayered body may be omitted, unlike a conventional tape casting process. Therefore, a pillowing phenomenon caused by a step between a surface of the dielectric layer on which the inner electrode is printed and a surface of the dielectric layer on which the inner electrode is not printed can be effectively prevented.

In the present invention, a spin coating solution containing a dielectric material for use in formation of the dielectric layer by spin coating is first prepared. However, the present invention is not limited in the specific composition of the spin coating solution. Thus, any dielectric material able to form the dielectric layer through the spin coating process may be used to obtain various solution compositions. That is, as the dielectric material, any one type of ceramic powder selected from among $BaTiO_3$, PZT, $SrTiO_3$ and $BaSrTiO_3$ is dispersed in the colloidal state into a solvent, to form various sols.

For example, a polymeric sol composed of a metal precursor solution of the dielectric material and an organic solvent is used as the spin coating solution.

Figure 4:
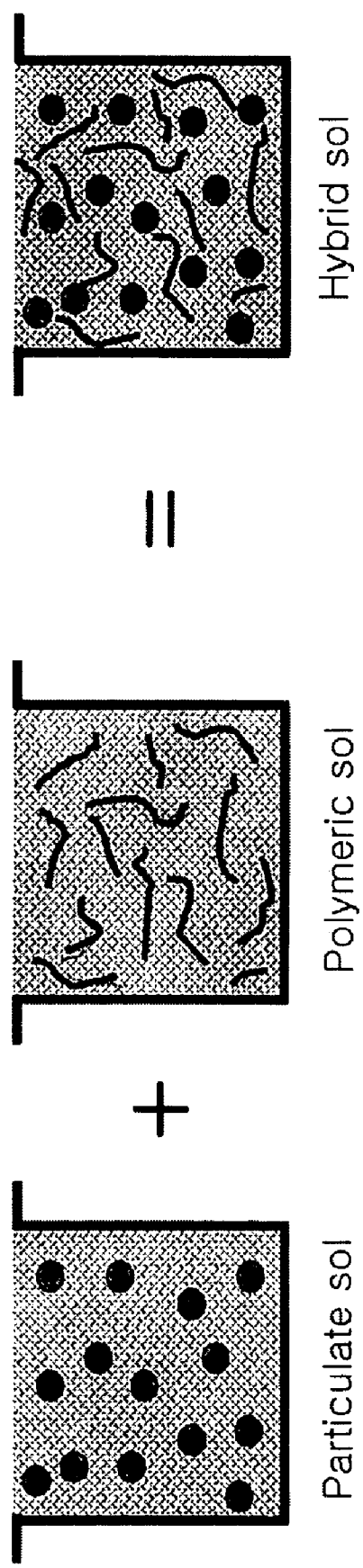
FIG. 4 is a view showing a process of preparing a hybrid sol, according to the present invention.

Preferably, (a) a particulate sol composed of ceramic powder of the dielectric material and the organic solvent, and (b) a polymeric sol composed of the metal precursor solution of the dielectric material and the organic solvent are mixed together, to prepare a hybrid sol, which is then used as a spin coating solution. The hybrid sol means a sol in the state of two kinds or more of colloidal particulates being simultaneously dispersed, and includes a mixture of particulate sol and polymeric sol, as shown in FIG. 4.

The polymeric sol, which is an admixture of the metal precursor solution of the dielectric material and the organic solvent, is a sol in which the dispersed colloid has a polymeric form. As such, it is known that an acetate process, an alkoxide process, and a hydroxide process are employed to prepare the polymeric sol.

The preparation method of the polymeric sol is simply described using barium titanate ($BaTiO_3$) as the dielectric material.

In the acetate process, barium acetate is admixed with titanium isoproxide. That is, barium acetate is dissolved in acetic acid and then stirred, to obtain a barium acetate solution, which is then added with titanium isoproxide, to prepare a $BaTiO_3$ sol. The acetate process is advantageous because of low material prices and easy water control.

In the alkoxide process, barium alkoxide is admixed with titanium isoproxide to prepare a $BaTiO_3$ sol. This process has the advantage of having low pyrolytic temperatures.

In the hydroxide process, barium hydroxide is admixed with titanium isoproxide to prepare a $BaTiO_3$ sol. This process is advantageous because of low pyrolytic temperatures and low material prices.

In this way, the polymeric sol is prepared using the acetate process, the alkoxide process or the hydroxide process. Of them, the acetate process is preferable.

In the case where the dielectric material is $BaTiO_3$, a metal precursor thereof comprises preferably of any one selected from among barium acetate, barium alkoxide and barium hydroxide, and titanium alkoxide including titanium isoproxide.

The polymeric sol of the present invention includes the metal precursor solution of the dielectric material and the solvent. As such, it is preferable that the solvent be an alcoholic solvent. The alcoholic solvent includes, for example, 2-methoxy ethanol or ethanol.

To the polymeric sol of the present invention, a reaction stabilizer may be further added. The reaction stabilizer functions to retard gelling of the sol, so that the polymeric sol can be stored for a long period. The reaction stabilizer is selected from among diethanol amine, triethanol amine, acetylacetone, and combinations thereof.

The polymeric sol, in the case where the dielectric material is $BaTiO_3$, is composed of 5–10 wt % barium acetate, 5–10 wt % titanium isoproxide, 40–65 wt % alcoholic solvent, 15–30 10 wt % acetic acid, and 3–10 wt % reaction stabilizer. In this case, barium acetate and titanium isoproxide are admixed at a molar ratio of 1:0.98–1.02, and preferably, at an equal molar ratio of 1:1, to control the equivalents of barium titanate. Acetic acid functions as a chemical catalyst so as to cause the polymerization. If the reaction stabilizer is used in an amount outside of the range of the present invention, polymerization does not occur, and precipitation may take place.

Furthermore, it is favorable that a polymer material be added to the polymeric sol of the present invention. As the polymer material, a polymer compound having a molecular weight of 5,000–1,500,000, and selected from among PVP (PolyVinyl Pyrrolidone), PAA (Poly Acrylic Acid), benzaldehyde, P-hydroxy benzoic acid, and combinations thereof, can be used.

In the case where the dielectric material is $BaTiO_3$, the polymeric sol includes 5–10 wt % barium acetate, 5–10 wt % titanium isoproxide, 40–65 wt % alcoholic solvent, 15–30 wt % acetic acid, 3–10 wt % reaction stabilizer, and 3–15 wt % polymer material. If the amount of the polymer material is less than 3 wt %, the amount of the polymer material is insufficient to act as a dispersing agent and a binder, and thus, optimal effects cannot result. On the other hand, if the amount exceeds 15 wt %, viscosity is excessively increased.

Meanwhile, the particulate sol, composed of an admixture of the ceramic powder of the dielectric material and the organic solvent, is a sol in which the ceramic powder is dispersed in a shape of solid particulates. The organic solvent includes an alcoholic solvent, for example, 2-methoxy ethanol or ethanol. As such, the ceramic powder and the organic solvent are admixed at a ratio of 20–40:60–80 (wt %:wt %). When the amount of the ceramic powder to be admixed is less than 20 wt %, the dielectric layer is formed to be too thin even though the coating process is performed only once. Meanwhile, if the above amount exceeds 40 wt %, a dielectric layer non-uniform in the range of ones of μm may be formed.

In the particulate sol, the ceramic powder is selected from among $BaTiO_3$, PZT, $SrTiO_3$ and $BaSrTiO_3$, and has a particulate size of 0.05–0.5 μm. The ceramic powder having a particulate size of less than 0.05 μm results in a high surface area, thus being difficult to disperse. On the other hand, if the size exceeds 0.5 μm, the coated film becomes non-uniform and stability is lowered due to sedimentation.

The hybrid sol as a spin coating solution is prepared by mixing the polymeric sol and the particulate sol, followed by deagglomeration and mixing using a ball mill. Preferably, the particulate sol, which is subjected to ball milling for deagglomeration of the powder, is mixed with the polymeric sol while stirring, to give the hybrid sol(pre-deagglomeration process).

In the present invention, the particulate sol and the polymeric sol are mixed at a ratio of 20–40:60–80 (wt %:wt %). If the particulate sol is added in the amount of less than 20 wt %, a desirable sintered density cannot result upon sintering. Meanwhile, if the amount of the particulate sol exceeds 40 wt %, the coated thickness greatly increases while stability of the hybrid sol becomes poor.

Figure 3B:
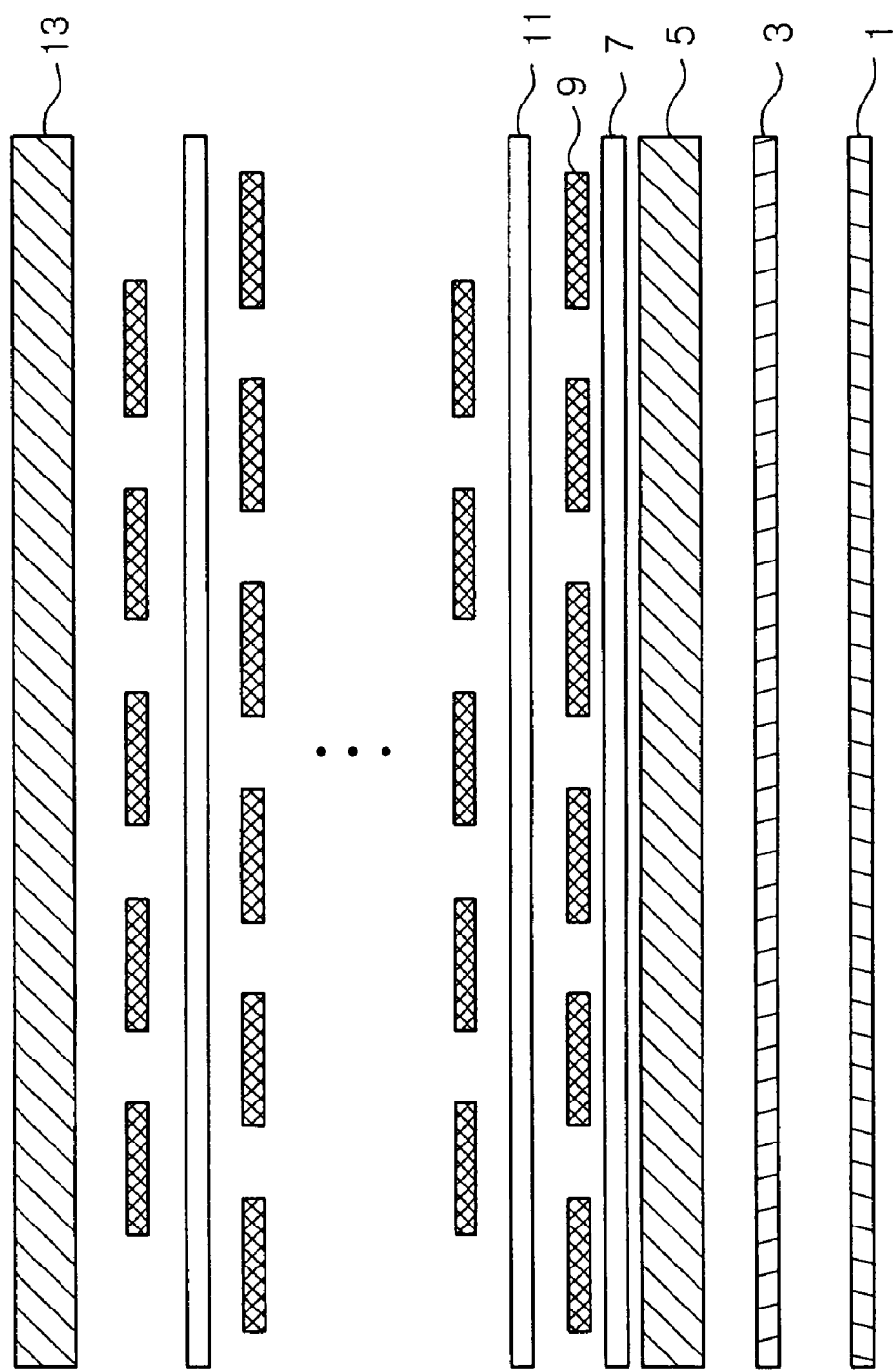
FIG. 3B is a side sectional view showing a ceramic multilayered body manufactured by the method of the present invention.

As shown in FIG. 3B, on a substrate 1, a spin coating solution such as a polymeric sol or a hybrid sol is formed into a first dielectric layer 7 by a spin coating process. The substrate 1 functions to support the dielectric layer 7 in a spin coater, and is not particularly limited in the present invention. For example, there is a wafer or a glass substrate.

Preferably, a releasing layer 3 is formed on the substrate 1, after which the first dielectric layer 7 is formed on the releasing layer 3 by spin coating. The releasing layer 3 is used to easily separate a ceramic multilayered body resulting from a subsequent spin coating process from the substrate 1. Hence, as the releasing layer 3, a foamed tape which has adhesion at room temperature and is easily separated by heat is preferably used.

In the cases of forming the releasing layer 3, the spin coating process is preferably performed at room temperature. The reason is that the releasing layer 3 has no adhesion when the spin coating process is carried out at high temperatures.

Further, upon spin coating, a rotation frequency of the substrate is preferably maintained at 500–5000 rpm. The dielectric layer is preferably 0.2–3 μm thick.

As necessary, before the first dielectric layer 7 is formed, a lower green sheet layer 5 is formed on the substrate 1 or the releasing layer 3 through a tape casting process. The green sheet layer 5 functions to control a thickness of the ceramic multilayered body and to protect the ceramic multilayered body from external impact.

Thereafter, as shown in FIG. 3A, the rotating substrate comes to a standstill, and the dielectric layer 7 is dried at high temperatures. The drying process acts to allow the sol to be a gel, so that an inner electrode pattern can be formed on the dielectric layer. At this time, the drying temperature ranges from about 100 to 500° C.

On the dried dielectric layer 7, a first inner electrode pattern 9 is formed. The inner electrode is preferably made of any one selected from among Ni, Cu, and alloys thereof. Also, the inner electrode pattern is formed through a screen printing process.

Alternatively, the inner electrode pattern 9 may be formed on the substrate 1 or the releasing layer 3, after which the first dielectric layer 7 may be formed on the inner electrode pattern 9. In the present invention, it should be noted that limitations are not imposed on the layer sequence.

After the first inner electrode pattern 9 is formed, a second dielectric layer 11 is formed by the same spin coating process as the formation process of the first dielectric layer 7.

The formation process of the first inner electrode pattern 9 and the first dielectric layer 7 is repeatedly performed on the second dielectric layer 11, thereby manufacturing a ceramic multilayered body having a desired number of layers. In the present invention, it is preferable that the number of layers be 10 or more.

After completion of the layering process, an upper green sheet layer 13 is preferably formed on the ceramic multilayered body. As mentioned above, the green sheet layer 13 serves to control the thickness of the ceramic multilayered body and to protect the multilayered body from external impact. And the ceramic multilayered body thus obtained is separated from the substrate 1 or the releasing layer 3.

Then, the ceramic multilayered body obtained by spin coating is cut into the size required for the multilayered ceramic capacitor, followed by sintering. In the present invention, the sintering process is preferably carried out in the range of 900–1250° C.

Therefore, in the present invention, the dielectric layer is formed by spin coating, whereby a compression process of the ceramic multilayered body required before the cutting and sintering processes in a conventional tape casting method may be omitted. Thus, a pillowing phenomenon caused by a step between a surface of the dielectric layer on which the inner electrode is printed and a surface of the dielectric layer on which the inner electrode is not printed does not occur.

Figure 5:
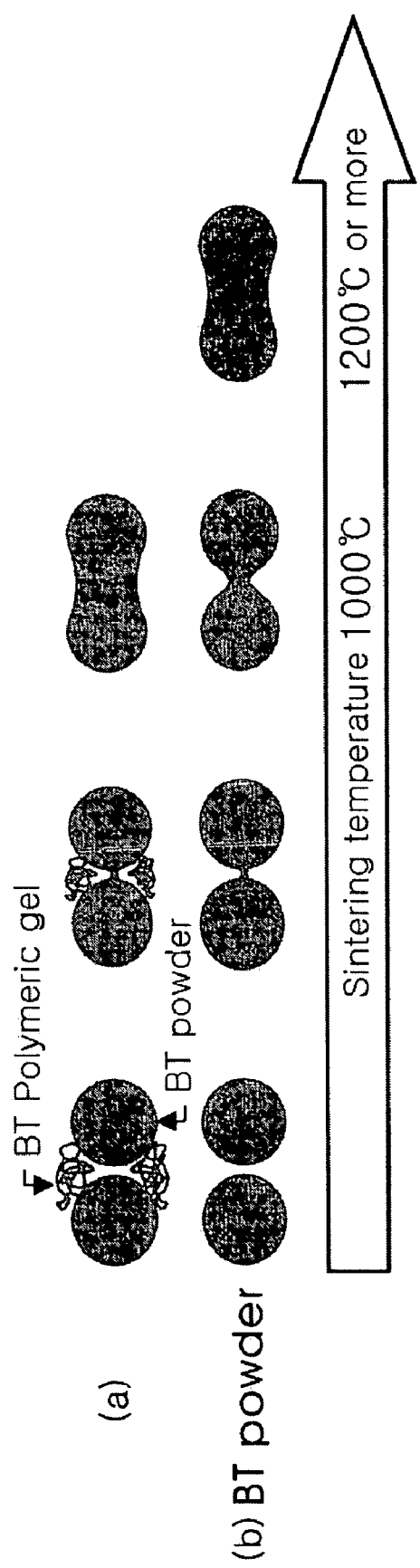
FIG. 5A is a view showing a sintering reaction of a hybrid sol-having a polymer.
FIG. 5B is a view showing a sintering reaction of ceramic powders caused by a tape casting process.
Figure 6:
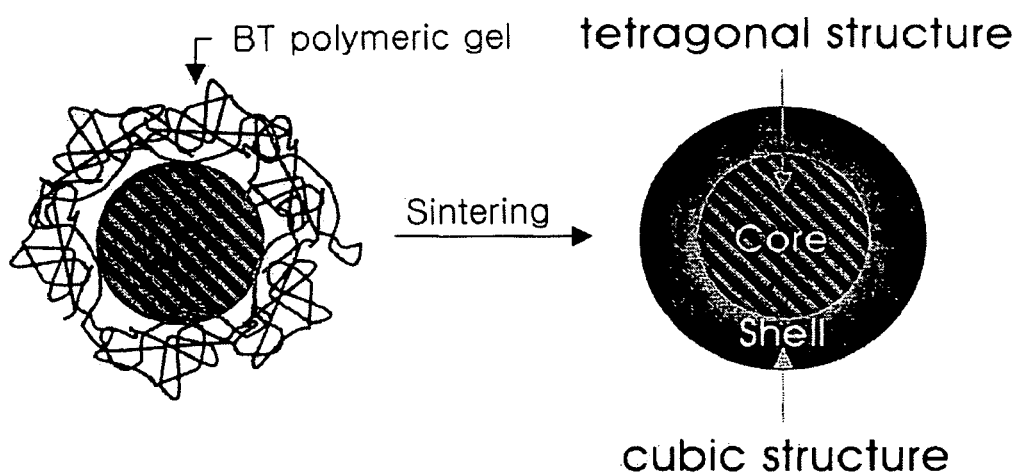
FIG. 6 is a view showing a structure of a polymeric sol in the hybrid sol before and after sintering the hybrid sol.

FIG. 5A shows the sintering reaction of the polymer-added hybrid sol, and FIG. 5B shows the sintering reaction of ceramic powders in the tape casting process. FIG. 6 shows the polymeric sol having a shell of a cubic structure on the ceramic powder after sintering.

Subsequently, outer electrodes which are electrically connected to the inner electrodes of the multilayered ceramic sintered body are formed on the ceramic sintered body. In addition, plated layers are formed on the outer electrodes, thereby fabricating a desired multilayered ceramic capacitor. Preferably, the outer electrode is formed of Cu or alloys thereof. Moreover, it is favorable that the above electrodes be formed through screen printing.

Consequently, the resultant multilayered ceramic sintered body is provided in the multilayered ceramic capacitor including the inner electrodes and the outer electrodes electrically connected to the inner electrodes.

The dielectric layer of the ceramic sintered body is 0.2–3 μm thick, and the number of layers constituting the ceramic sintered body is 10 or more. The inner electrode is formed of any one selected from among Ni, Cu, and alloys thereof. The outer electrode is formed of Cu or alloys thereof.

A better understanding of the present invention may be obtained in light of the following examples which are set forth to illustrate, but are not to be construed to limit the present invention.

EXAMPLE 1

Preparation of Particulate Sol

15–40 wt % BaTiO$_3$ having an average particulate size of 0.05–0.5 μm was admixed with 60–85 wt % 2-methoxy ethanol, to prepare a particulate sol, part of which was subjected to ball milling for 24 hours.

Preparation of Polymeric Sol

5–10 wt % barium acetate was dissolved in 15–30 wt % acetic acid and then stirred, to obtain a barium acetate solution. Separately, 5–10 wt % titanium isoproxide was added to 40–65 wt % 2-methoxy ethanol, to obtain a titanium isoproxide solution. Subsequently, while the barium acetate solution was added one droplet at a time to the titanium isoproxide solution, the two solutions were admixed. At this time, the admixing process was performed to achieve a molar ratio of 1:1. Then, the admixture was further mixed for 1 hour, after which this admixture was added with acetylacetone as a reaction inhibitor to ensure the reaction stability.

Preparation of Hybrid Sol

The particulate sol and the polymeric sol were mixed according to mixing ratios shown in Table 1, below. The resultant mixture was loaded into a ball mill, and then a ball milling process was performed at 200 rpm for 6 hours, to prepare a hybrid sol.

Meanwhile, the particulate sol, which was subjected to ball milling upon preparation of the particulate sol, was mixed with the polymeric sol using a stirrer for about 30 min, to obtain a further hybrid sol (application of pre-deagglomeration process).

Fabrication of Ceramic Multilayered Body

A foamed tape was layered on a 6 inch-sized wafer, after which a dielectric layer obtained by a tape casting process was layered on the foamed tape. The wafer was rotated at 3000 rpm, so that the hybrid sol on the dielectric layer was formed into a dielectric layer by spin coating and then dried in the temperature range from room temperature to 80° C.

On the spin coated dielectric layer, a series of the processes of printing an electrode, forming a dielectric layer by spin coating and then drying were repeatedly performed, to obtain a ceramic multilayered body having 10 layers, which was then heated to 100–120° C. and separated from the foamed sheet. In this case, the formed dielectric layer was about 1 μm thick.

To assay stability of the hybrid sol, in cases where the prepared hybrid sol was heat-treated at 80° C., the time required for gelling was measured. The results are given in Table 1, below.

When the hybrid sol was formed into the dielectric layer by a spin coating process, a roughness of the dielectric layer was measured. The results are shown in Table 1, below. Further, whether a striped pattern was generated was confirmed with the naked eyes. If the mixing ratio of particulate sol/polymeric sol, 30/70, 24/76 and 40/60 (wt %/wt %), in Table 1, is converted into vol %/vol %, 7/93, 5/95 and 10/90 result.

TABLE 1

| | Mixing Ratio of Particulate Sol/Polymeric Sol (wt %/wt %) | Application of pre-deagglomeration | Time required for Gelling (hr) | Roughness of Dielectric Layer (μm) (Striped Pattern) |
|---|---|---|---|---|
| 1 | 20/80 | No  | 3  | 1.0 (Non-Striped Pattern) |
| 2 | 20/80 | Yes | 7  | 0.6 (Non-Striped Pattern) |
| 3 | 30/70 | No  | 10 | 1.1 (Non-Striped Pattern) |
| 4 | 30/70 | Yes | 12 | 0.5 (Non-Striped Pattern) |
| 5 | 24/76 | No  | 11 | 1.3 (Non-Striped Pattern) |
| 6 | 24/76 | Yes | 12 | 0.8 (Non-Striped Pattern) |
| 7 | 40/60 | No  | 5  | 1.5 (Non-Striped Pattern) |
| 8 | 40/60 | Yes | 6  | 1.0 (Non-Striped Pattern) |

As apparent from Table 1, the hybrid sol of the present invention requires 3 hours or more for gelling, thus exhibiting high sol stability.

Further, the formed dielectric layer has a roughness of 1.5 μm or less, and has no striped pattern, thereby showing superior coatability.

Meanwhile, it can be found that, upon preparation of the spin coating solution, the spin coating solution subjected to pre-deagglomeration process has superior results to the spin coating solution not subjected to pre-deagglomeration process.

EXAMPLE 2

Preparation of Particulate Sol

15–40 wt % BaTiO$_3$ powder having an average particulate size of 0.05–0.5 μm was admixed with 60–85 wt % 2-methoxy ethanol (2-MOE), to prepare a particulate sol, part of which was subjected to ball milling for 24 hours.

Preparation of Polymeric Sol having Polymer

5–10 wt % barium acetate was dissolved in 15–30 wt % acetic acid and then stirred, to prepare a barium acetate solution. Separately, 5–10 wt % titanium isoproxide was added to 40–65 wt % 2-methoxy ethanol, to prepare a titanium isoproxide solution.

Thereafter, while the barium acetate solution was added one droplet at a time to the titanium isoproxide solution, the two solutions were admixed. At this time, the admixing process was carried out to achieve a molar ratio of 1:1. Then, the admixture was additionally mixed for 1 hour, after which the resultant admixture was added with acetylacetone as a reaction inhibitor to ensure the reaction stability. Subsequently, 7 wt % polyvinylpyrrolidone was further added as a polymer material, followed by stirring for about 45 min, to obtain a polymeric sol.

Preparation of Hybrid Sol

The particulate sol and the polymeric sol were mixed according to mixing ratios shown in Table 2, below. The mixture was loaded into a ball mill, and then a ball milling process was performed at 200 rpm for 6 hours, to prepare a hybrid sol.

On the other hand, the particulate sol, which was subjected to ball milling upon preparation of the particulate sol, was mixed with the polymeric sol using a stirrer for about 30 min, to prepare a further hybrid sol (application of pre-deagglomeration process).

Fabrication of Ceramic Multilayered Body

A foamed tape was layered on a 6 inch-sized wafer, after which a dielectric layer formed by tape casting was layered on the foamed tape. While the wafer was rotated at 2500–4500 rpm, the hybrid sol on the dielectric layer was formed into a dielectric layer by spin coating and then dried in the temperature range from room temperature to 80° C.

On the spin coated dielectric layer, the series of the processes of printing an electrode, forming a dielectric layer by spin coating and then drying was repeatedly performed to obtain a ceramic multilayered body having 10 layers, which was then heated to 100–120° C. and separated from the foamed sheet. At this time, the formed dielectric layer had a thickness of about 1 μm.

Upon heat-treatment of the prepared hybrid sol at 80° C., the time required for gelling was measured. The results are presented in Table 2, below. Also, when the hybrid sol was formed into the dielectric layer by the spin coating process, a roughness of the dielectric layer was measured. The results are shown in Table 2, below. Whether a striped pattern was generated was confirmed with the naked eyes.

TABLE 2

|   | Mixing Ratio of Particulate Sol/Polymeric Sol (wt %/wt %) | Application of pre-deagglomeration | Time required for Gelling (hr) | Roughness of Dielectric Layer (μm) (Striped Patten) |
|---|---|---|---|---|
| 1 | 20/80 | No | 7 | 0.4 (Non-Striped Pattern) |
| 2 | 20/80 | Yes | 13 | 0.4 (Non-Striped Pattern) |
| 3 | 30/70 | No | 12 | 0.7 (Non-Striped Pattern) |
| 4 | 30/70 | Yes | 13 | 0.4 (Non-Striped Pattern) |
| 5 | 24/76 | No | 12 | 0.8 (Non-Striped Pattern) |
| 6 | 24/76 | Yes | 13 | 0.3 (Non-Striped Pattern) |
| 9 | 40/60 | No | 8 | 0.5 (Non-Striped Pattern) |
| 10 | 40/60 | Yes | 9 | 0.7 (Non-Striped Pattern) |

As in Table 2, it can be seen that the hybrid sol containing the polymer material (polyvinylpyrrolidone) used as a spin coating solution has higher sol stability and coatability, compared to the hybrid sol without the polymer of Example 1.

Moreover, it appears that the hybrid sol subjected to pre-deagglomeration process has results superior to the hybrid sol not subjected to pre-deagglomeration process.

Figure 7:
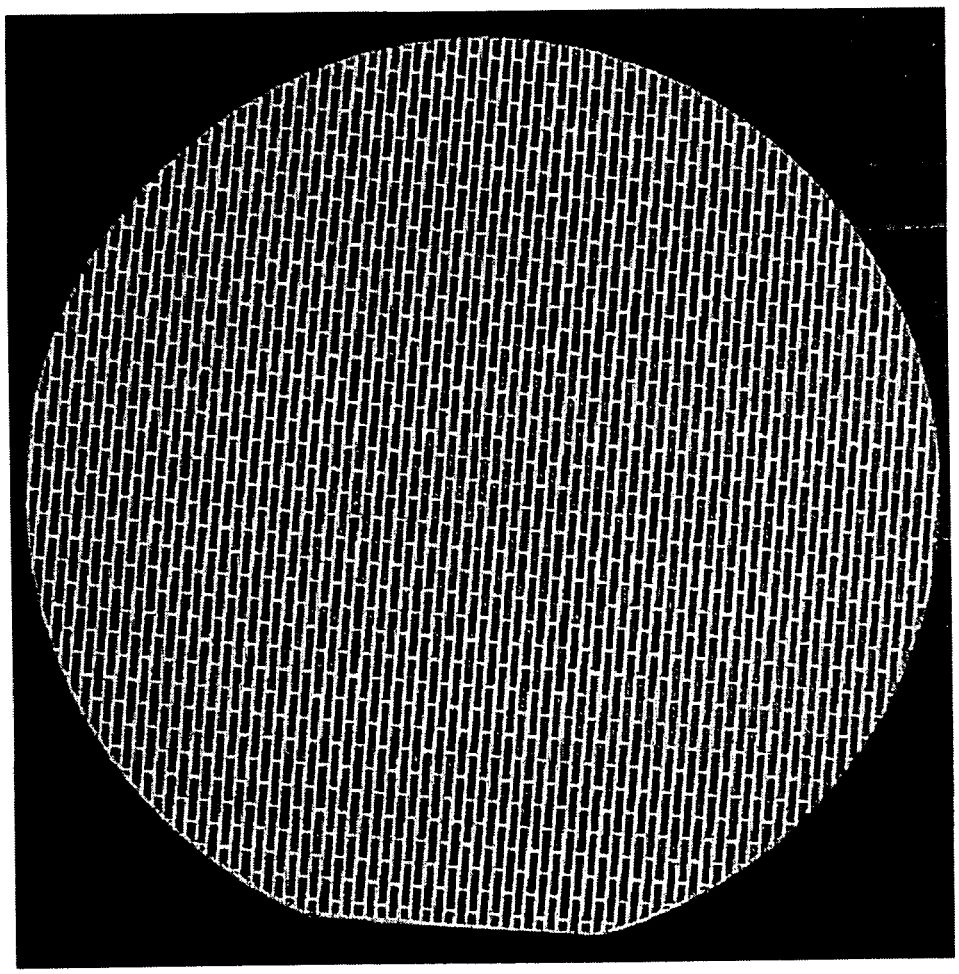
FIG. 7 is a photograph showing an inner electrode formed on the dielectric layer obtained by a spin coating process.
Figure 8:
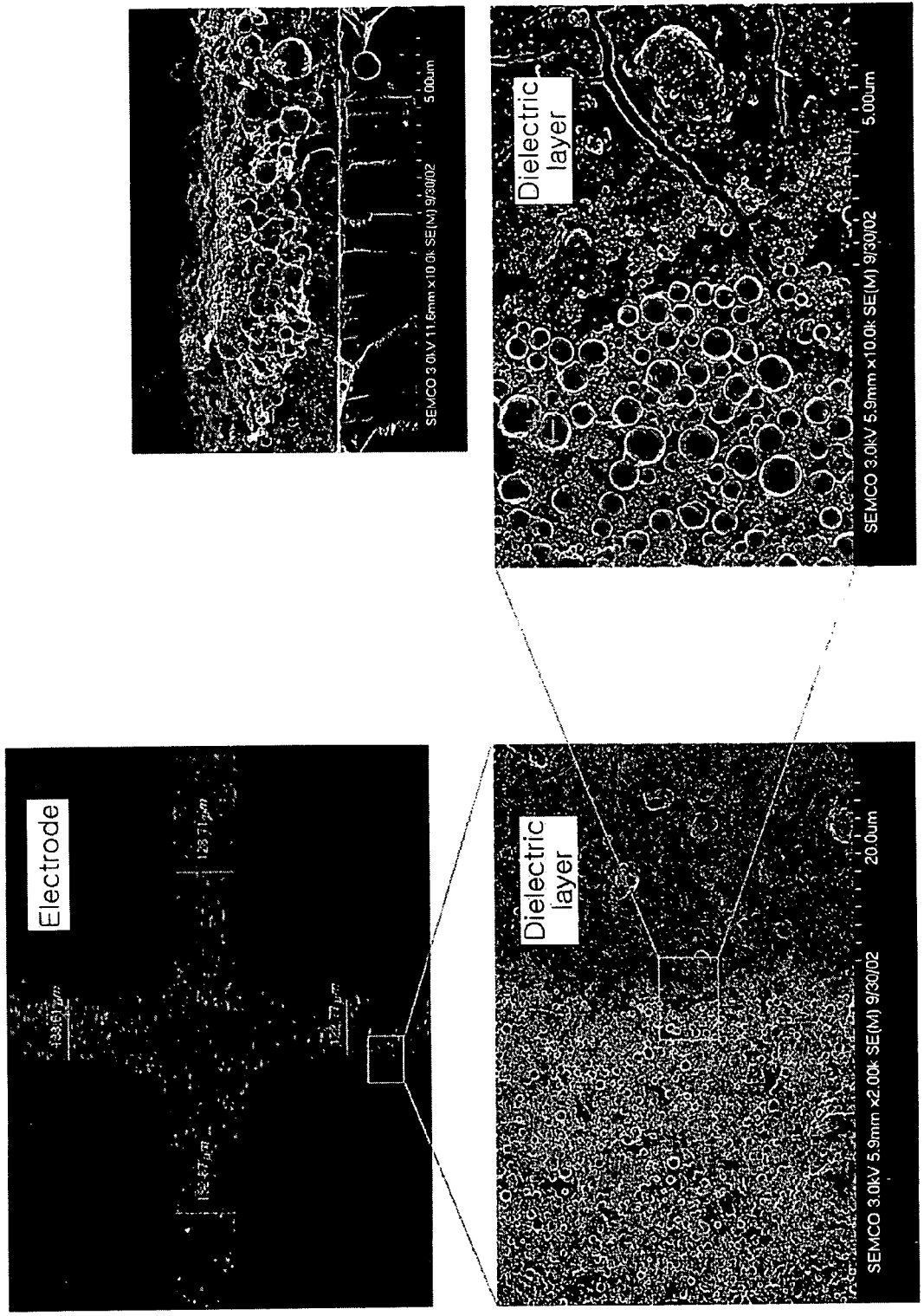
FIG. 8 is photographs showing the wettability of the inner electrode to the dielectric layer formed by a spin coating process.
Figure 9:
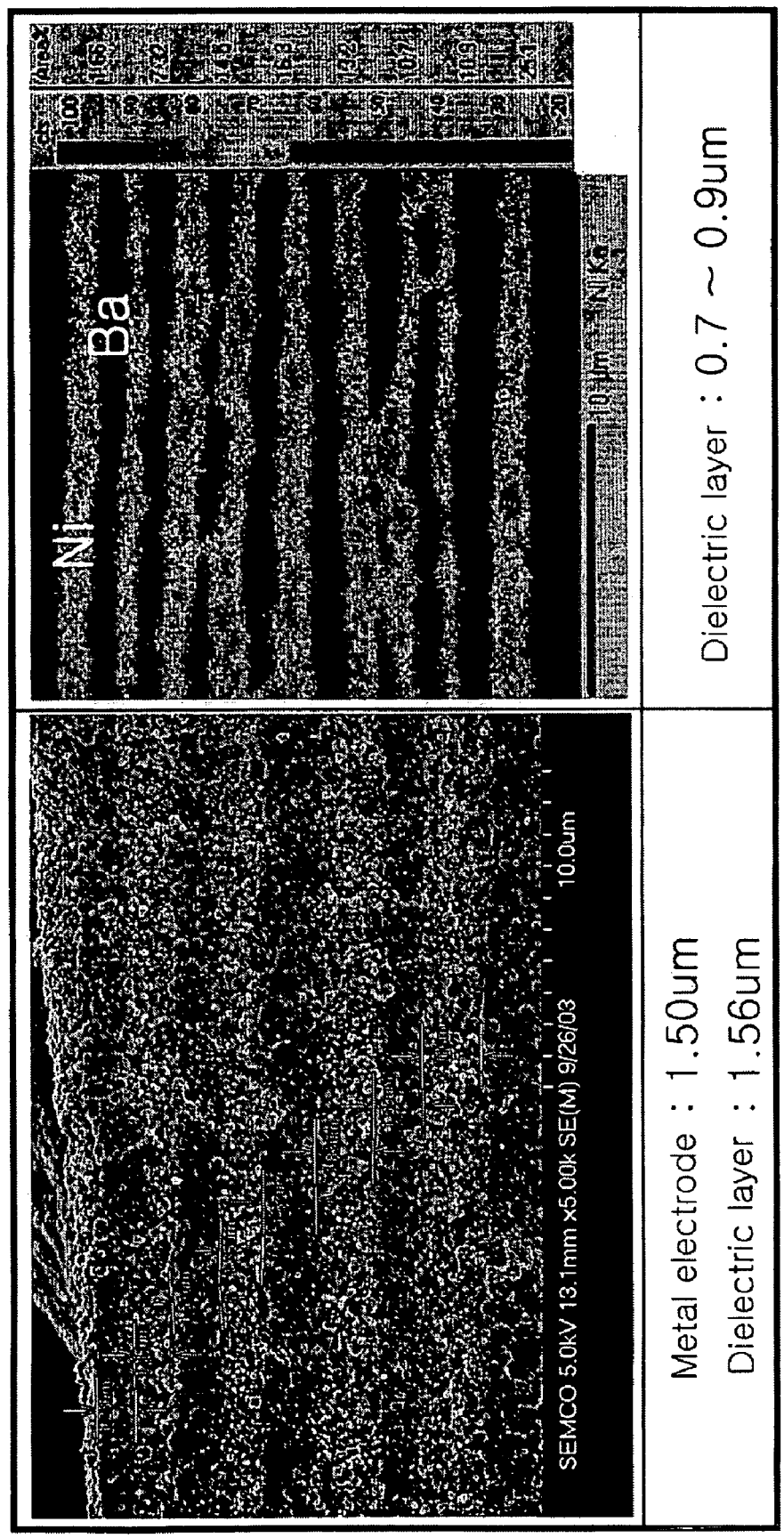
FIG. 9 is a sectional photograph showing a ceramic multilayered body manufactured by a spin coating process.

FIGS. 7–9 show the experimental results using the spin coating solution which was not subjected to pre-deagglomeration process in Example 2.

Specifically, FIG. 7 is a photograph in which the inner electrode is printed on the dielectric layer formed by spin coating. An Ni inner electrode paste used for the experiment had a viscosity of 8,000, and a screen was 500 mesh. As seen in the photograph, the inner electrode is uniformly printed.

FIG. 8 is photographs showing the surface wettability of the Ni inner electrode paste hand-printed on the dielectric layer which is formed by spin coating. In this drawing, it can be shown that the wettability is excellent.

FIG. 9 is a sectional photograph of the ceramic multilayered body obtained by spin coating, in which the dielectric layer is formed into a thin layer having a thickness of 1 μm or less. From this result, it can be shown that the dielectric layer is formed to be uniformly thin.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, in addition to barium titanate as a dielectric material, any dielectric material used for multilayered ceramic capacitors may be used.

As described above, the present invention provides a method of manufacturing a multilayered ceramic capacitor by spin coating, and a multilayered ceramic capacitor obtained by the above method. The multilayered ceramic capacitor can be manufactured by a single process of forming the thin dielectric layer by spin coating while printing the inner electrode thereon. Thereby, in the present invention, the processes of separating and layering the dielectric layers and the compression process can be omitted. Further, a pillowing phenomenon of the multilayered ceramic capacitor does not occur.

The invention claimed is:

1. A method of manufacturing a multilayered ceramic capacitor by spin coating, comprising:
   a first step of forming a first dielectric layer on a substrate by spin coating;

a second step of forming an inner electrode on the dielectric layer;

a third step of forming a second dielectric layer on the inner electrode by spin coating;

a fourth step of repeating the second step and the third step, to form a ceramic multilayered body having a predetermined number of layers;

a fifth step of cutting and then sintering the ceramic multilayered body; and a sixth step of forming outer electrodes on the ceramic sintered body.

2. The method as set forth in claim 1, wherein the dielectric layer has a thickness of 0.2–3 am.

3. The method as set forth in claim 1, wherein the number of layers of the dielectric layers and the inner electrodes constituting the ceramic multilayered body is 10 or more.

4. The method as set forth in claim 1, wherein the inner electrode is formed of any one selected from among Ni, Cu, and alloys thereof.

5. The method as set forth in claim 1, wherein the forming the electrode is performed by screen printing.

6. The method as set forth in claim 1, wherein the sintering is performed at 900–1250° C.

7. The method as set forth in claim 1, wherein the dielectric layer is selected from among a $BaTiO_3$ layer and a PZT layer.

8. The method as set forth in claim 1, further comprising a step of forming a releasing layer on the substrate, wherein the first dielectric layer is formed on the releasing layer in the first step.

9. The method as set forth in claim 8, wherein the forming the dielectric layer by spin coating is performed at room temperature.

10. The method as set forth in claim 1, wherein the forming the dielectric layer on the substrate by spin coating is performed using a polymeric sol comprising a metal precursor solution of a dielectric material and an organic solvent.

11. The method as set forth in claim 10, wherein the metal precursor of $BaTiO_3$ as the dielectric material comprises any one selected from among barium acetate, barium alkoxide, and barium hydroxide, and titanium alkoxide including titanium isoproxide.

12. The method as set forth in claim 10, wherein the organic solvent comprises an alcoholic solvent selected from among 2-methoxy ethanol and ethanol.

13. A multilayered ceramic capacitor, comprising the multilayered ceramic sintered body manufactured by a method according to claim 1, in which the inner electrodes of the multilayered ceramic sintered body and the outer electrodes are electrically connected to each other.

14. The multilayered ceramic capacitor as set forth in claim 13, wherein the dielectric layer of the multilayered ceramic sintered body has a thickness of 0.2–3 μm, and the number of layers thereof is 10 or more.

15. The multilayered ceramic capacitor as set forth in claim 13, wherein the inner electrode is formed of any one selected from among Ni, Cu and alloys thereof, and the outer electrode is formed of Cu or alloys thereof.

16. A method of manufacturing a multilayered ceramic capacitor by spin coating, comprising:

a first step of preparing (a) a particulate sol composed of ceramic powder of a dielectric material and an organic solvent, and (b) a polymeric sol composed of a metal precursor solution of a dielectric material and an organic solvent, followed by mixing (a) and (b), to prepare a hybrid sol;

a second step of forming a first dielectric layer on a substrate by spin coating using the hybrid sol, followed by drying;

a third step of forming an inner electrode on the dielectric layer;

a fourth step of forming a second dielectric layer on the inner electrode by spin coating using the hybrid sol, followed by drying;

a fifth step of repeating the third step and the fourth step, to form a ceramic multilayered body having a predetermined number of layers;

a sixth step of cutting and then sintering the ceramic multilayered body; and a seventh step of forming outer electrodes on the ceramic sintered body.

17. The method as set forth in claim 16, wherein the dielectric layer has a thickness of 0.2–3 μm.

18. The method as set forth in claim 16, wherein the number of layers of the dielectric layers and the inner electrodes constituting the ceramic multilayered body is 10 or more.

19. The method as set forth in claim 16, wherein the inner electrode is formed of any one selected from among Ni, Cu, and alloys thereof.

20. The method as set forth in claim 16, wherein the forming the electrode is performed by screen printing.

21. The method as set forth in claim 16, wherein the sintering is performed at 900–1250° C.

22. The method as set forth in claim 16, wherein the hybrid sol comprises 20–40 wt % particulate sol and 60–80 wt % polymeric sol.

23. The method as set forth in claim 22, wherein the polymeric sol comprises 5–10 wt % barium acetate, 5–10 wt % titanium isoproxide, 40–65 wt % alcoholic solvent, 15–30 wt % acetic acid, and 3–10 wt % reaction stabilizer.

24. The method as set forth in claim 22, wherein the particulate sol comprises 20–40 wt % barium titanate powder and 60–80 wt % alcoholic solvent.

25. The method as set forth in claim 24, wherein the barium titanate has an average particulate size of 0.05–0.5 μm.

26. The method as set forth in claim 16, wherein the dielectric material comprises $BaTiO_3$, the particulate sol comprises an admixture of barium titanate ($BaTiO_3$) powder and an alcoholic solvent, and the polymeric sol comprises any one selected from among barium acetate, barium alkoxide, and barium hydroxide, titanium isoproxide, and the alcoholic solvent.

27. The method as set forth in claim 26, wherein the alcoholic solvent is 2-methoxy ethanol or ethanol.

28. The method as set forth in claim 26, wherein the polymeric sol further comprises any one reaction stabilizer selected from among diethanol amine, triethanol amine, and acetylacetone.

29. The method as set forth in claim 26, wherein the polymeric sol further comprises any one polymer material selected from among polyvinyl pyrrolidone, polyacrylic acid, benzaldehyde, and p-hydroxy benzoic acid.

30. The method as set forth in claim 16, further comprising a step of forming a releasing layer on the substrate, wherein the first dielectric layer is formed on the releasing layer in the second step.

31. The method as set forth in claim 30, wherein the forming the dielectric layer by spin coating is performed at room temperature.

32. The method as set forth in claim 16, wherein the first step comprises deagglomerating the ceramic powder by ball milling to prepare the particulate sol and mixing the particulate sol and the polymeric sol by stirring to obtain the hybrid sol.

33. A method of manufacturing a multilayered ceramic capacitor by spin coating, comprising:
- a first step of preparing (a) a particulate sol composed of ceramic powder of a dielectric material and an organic solvent, and (b) a polymeric sol composed of a metal precursor solution of a dielectric material, an organic solvent and a polymer material, followed by mixing (a) and (b), to prepare a hybrid sol;
- a second step of forming a first dielectric layer on a substrate by spin coating using the hybrid sol, followed by drying;
- a third step of forming an inner electrode on the dielectric layer;
- a fourth step of forming a second dielectric layer on the inner electrode by spin coating using the hybrid sol, followed by drying;
- a fifth step of repeating the third step and the fourth step to form a ceramic multilayered body having a predetermined number of layers;
- a sixth step of cutting and then sintering the ceramic multilayered body; and
- a seventh step of forming outer electrodes on the ceramic sintered body.

34. The method as set forth in claim 33, wherein the dielectric layer has a thickness of 0.2–3 μm.

35. The method as set forth in claim 33, wherein the number of layers of the dielectric layers and the inner electrodes constituting the ceramic multilayered body is 10 or more.

36. The method as set forth in claim 33, wherein the inner electrode is formed of any one selected from among Ni, Cu, and alloys thereof.

37. The method as set forth in claim 33, wherein the forming the electrode is performed by screen printing.

38. The method as set forth in claim 33, wherein the sintering is performed at 900–1250° C.

39. The method as set forth in claim 33, wherein the hybrid sol comprises 20–40 wt % particulate sol and 60–80 wt % polymeric sol.

40. The method as set forth in claim 39, wherein the polymeric sol comprises 5–10 wt % barium acetate, 5–10 wt % titanium isoproxide, 40–65 wt % alcoholic solvent, 15–30 wt % acetic acid, 3–10 wt % reaction stabilizer, and 3–15 wt % polymer material.

41. The method as set forth in claim 39, wherein the particulate sol comprises 20–40 wt % barium titanate powder and 60–80 wt % alcoholic solvent.

42. The method as set forth in claim 41, wherein the barium titanate has an average particulate size of 0.05–0.5 μm.

43. The method as set forth in claim 33, wherein the dielectric material comprises $BaTiO_3$,
- the particulate sol comprises an admixture of barium titanate ($BaTiO_3$) powder and an alcoholic solvent, and
- the polymeric sol comprises any one selected from among barium acetate, barium alkoxide, and barium hydroxide, titanium isoproxide, the alcoholic solvent, and the polymer material.

44. The method as set forth in claim 43, wherein the alcoholic solvent is 2-methoxy ethanol or ethanol.

45. The method as set forth in claim 43, wherein the polymeric sol further comprises any one reaction stabilizer selected from among diethanol amine, triethanol amine, and acetylacetone.

46. The method as set forth in claim 33, wherein the polymer material is any one selected from among polyvinyl pyrrolidone, polyacrylic acid, benzaldehyde, and p-hydroxy benzoic acid.

47. The method as set forth in claim 33, further comprising a step of forming a releasing layer on the substrate, wherein the first dielectric layer is formed on the releasing layer in the second step.

48. The method as set forth in claim 47, wherein the forming the dielectric layer by spin coating is performed at room temperature.

49. The method as set forth in claim 33, wherein the first step comprises deagglomerating the ceramic powder by ball milling to prepare the particulate sol and mixing the particulate sol and the polymeric sol by stirring to obtain the hybrid sol.

* * * * *